United States Patent
Hamel et al.

(10) Patent No.: US 6,204,943 B1
(45) Date of Patent: Mar. 20, 2001

(54) RECONFIGURABLE RING TRANSMISSION NETWORK WITH MULTIPLEXING IN WAVE LENGTH FOR SEMI-PERMANENT LINKS

(75) Inventors: André Hamel, Lammion; Daniel Laville, Perros Guirec; Jean Stoschek, Pleumeur-Bodou, all of (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/021,593

(22) Filed: Feb. 10, 1998

(30) Foreign Application Priority Data

Feb. 14, 1997 (FR) .................................. 97 01744

(51) Int. Cl.$^7$ ............... H04J 14/02; H04J 14/08; H04B 10/20; G01R 31/08
(52) U.S. Cl. .................. 359/119; 359/128; 359/139; 359/125; 370/222
(58) Field of Search ................... 359/124, 125, 359/128, 139, 119; 370/222, 223, 224, 60

(56) References Cited

U.S. PATENT DOCUMENTS

| | | | |
|---|---|---|---|
| 5,550,818 | * 8/1996 | Brackett et al. | 370/60 |
| 5,576,875 | 11/1996 | Chawki et al. | 359/125 |
| 5,930,016 | * 7/1999 | Brorson et al. | 359/127 |

FOREIGN PATENT DOCUMENTS 0 743 772 A1    11/1996   (EP) .

OTHER PUBLICATIONS

U.S. application No. 08/643,459, filed May 8, 1996.
U.S. application No. 08/802,483, filed Feb. 20, 1997.
Wagner S S Et Al: "Multiwavelength Ring Newworks for Switch Consolidation and Interconnection", Discovering a New World of Communications, Chicago, Jun. 14–18, 1992 Bound Together With B0190710, vol. 4, vol. 3 of 4, Jun. 14, 1992, Institute of Electrical and Electronics Engineers, pp. 1173–1179, XP000337910.
Kuo–Chun Lee Et Al: "Rounting and Switching in a Wavelength Convertible Optical Network", Networking: Foundation for the Future, San Francisco, Mar. 28–Apr. 1, 1993, vol. 2, Mar. 28, 1993, Institute of Electrical and Electronics Engineers, pp. 578–585, XP000399037.

* cited by examiner

Primary Examiner—Jason Chan
Assistant Examiner—M. R. Sedighian
(74) Attorney, Agent, or Firm—Pearne & Gordon LLP

(57) ABSTRACT

Reconfigurable ring transmission network with multiplexing in wavelength for semi-permanent links, the network including at least one ring (10) comprising nodes (12) and at least one optical fiber (18, 20) passing through the nodes, and each site (13) in the network comprises transmission-reception means (EN, ES, RN, RS) for one or more wavelengths and each node comprises optical add-drop means (IN, IS, XN, XS) for this wavelength and optical switching means (CN, CS) to connect these means to the transmission-reception means, the network used for optical telecommunications.

9 Claims, 5 Drawing Sheets

RECONFIGURABLE RING TRANSMISSION NETWORK WITH MULTIPLEXING IN WAVE LENGTH FOR SEMI-PERMANENT LINKS

DESCRIPTION

1. Technical Field

This invention relates to a reconfigurable transmission network for semi-permanent or, more generally, temporary links.

It is particularly applicable to optical telecommunications.

2. State of Prior Art

Known networks that make temporary links between two users are based on a star architecture and multiplexing in wave length.

The resources of a network of this type are pooled by an optical coupler.

Each station in the network is equipped with a matchable optical filter that selects the wave length used as a support to transmit the information.

With commercially available components, the filter has to be locked onto the working wave length in order to provide stable operation.

In this respect, refer to document (1) which is mentioned in the references at the end of this description, like the other documents mentioned later.

A data network superposed on the star network manages the network and initiates communication.

The disadvantage of this type of star network is due to the lack of security means if there is a simple failure of an optical fiber.

Two optical fibers transmit information between the optical coupler which can be single or multiple, and a station.

If a fiber is interrupted, the station will then be isolated from the rest of the network.

Document (2) also describes a passive star architecture.

Known rings designed for transmission called Synchronous Digital Hierarchy or SDH comprise two optical fibers which go in opposite propagation directions and are capable of transmitting information even if the cable is broken.

Document (3) provides further information on this subject.

Known reconfigurable architectures are based on spectral routing and the use of matchable optical filters.

Document (4) provides further information on this subject.

Two filter categories are currently available.

The first category comprises Fabry-Perot fiber filters made using micro-optic techniques.

Several products of this type are commercially available.

The corresponding insertion losses are about 2 dB and the fineness is between 100 and 200.

However, these fiber Fabry-Perot filters are components with two channels that are only capable of selecting one out of several wave lengths.

The add-drop function is obtain using an optical coupler.

The second category consists of the acousto-optical modulator made in integrated optics on $LiNbO_3$.

This modulator performs the add-drop function directly and its matchability range is about 100 nm.

It also has the advantage that it enables multiple channel selection.

It has been designed for transmission with a distance between channels of 4 nm.

Document (5) provides further information on this subject.

Modulators of this type are still at the laboratory stage and they have the disadvantage of a high level of cross talk (from 15 to 18 dB) which limits their application to long distances between channels (greater than 4 nm) and makes reuse of wave lengths critical.

These modulators have a high temperature coefficient (of the order of 0.1 nm/° C.) and consequently a stable temperature is necessary for stable operation.

Finally with the two filter categories considered, a servo-control has to be used to lock a station onto the chosen wave length, in addition to the control which selects this wave length.

DISCLOSURE OF THE INVENTION

The purpose of this invention is to overcome the previous disadvantages related to the use of matchable filters.

In order to do this, the invention uses spectral routing on a ring network with fixed optical filters and optical switches designed to set up links between network stations or users.

Specifically, the purpose of the invention is a reconfigurable transmission network for connection of users, this network comprising at least one information transmission ring in optical form and network management means, each ring comprising:

several nodes, each node being associated with a site on which there is at least one user, and at least one optical fiber in the form of a ring that passes through each node in turn and which is designed to carry information in a given direction, this network being characterized in that it also comprises:

on each site, transmission-reception means for one or more particular wave lengths, and at each node, optical add-drop means for the particular wave length and optical switching means that are capable of being in first and second states, are controlled by the network management means and are capable of optically connecting the transmission-reception means included on the corresponding site, to the add-drop means when they are in the first state, and optically isolating the transmission-reception means from the add-drop means when they are in the second state, these add-drop means being designed to extract information at the particular wave length from each optical fiber in the ring, to send them to the transmission-reception means on the corresponding site and to insert information at the particular wave length from these transmission-reception means in each optical fiber in the ring, in order to create temporary optical links for the particular wave length under the control of the management means, between users on distinct sites, for two users at a time.

According to a preferred embodiment of the network according to the invention, each node comprises an electronic add-drop multiplexer that is designed to exchange information in optical form with the corresponding site and which is used by management means to control optical switching means at this node.

According to a first specific embodiment of the network according to the invention, the ring is connected to a main information transmission network, at least one electronic add-drop multiplexer being installed on this main information transmission network, fitted with transmission-reception means for a particular wave length and connected to the ring by add-drop means for the particular wave length.

According to a second particular embodiment, the network comprises several rings connected to a main information transmission network, several electronic add-drop multiplexers being installed on this main information transmission network each associated with rings, each electronic add-drop multiplexer being equipped with transmission-reception means for the particular wave length and connected to the corresponding ring by add-drop means for the particular wave length.

At least one site may comprise N users associated with N transmission-reception means on this site, where N is an integer number equal to at least 2, the node corresponding to this site also comprising N optical switches of the 1 to N type which are controlled by network management means so as to create an optical link for the particular wave length between any of the users on this site and a user on another site.

Preferably, the network comprises two optical fibers in the form of a ring, designed to carry information in opposite directions.

The optical switching means that may be in the first or second state may be cross-bar type switches.

For example, the information in the optical form has a wave length equal to 1.3 μm and the particular wave length is equal to 1.5 μm.

Each site may comprise transmission-reception means for several particular wave lengths, associated respectively with several optical add-drop means for these particular wave lengths, in order to simultaneously set up several temporary optical links.

Each ring is preferably designed to use the Synchronous Digital Hierarchy standard.

BRIEF DESCRIPTION OF DRAWINGS

This invention will be better understood by reading the following description of example embodiments, given for information only and in no way restrictive, with reference to the attached drawings in which.

DETAILED DISCLOSURE OF PARTICULAR EMBODIMENTS

With the introduction of the Synchronous Digital Hierarchy, ring transmission architectures have an economic advantage and are more reliable.

At the present time, electronic equipment called add-drop multiplexers (ADM) is installed at each node of a ring network and information is sent through the optical fibers that make the junction between the network nodes.

Figure 1:
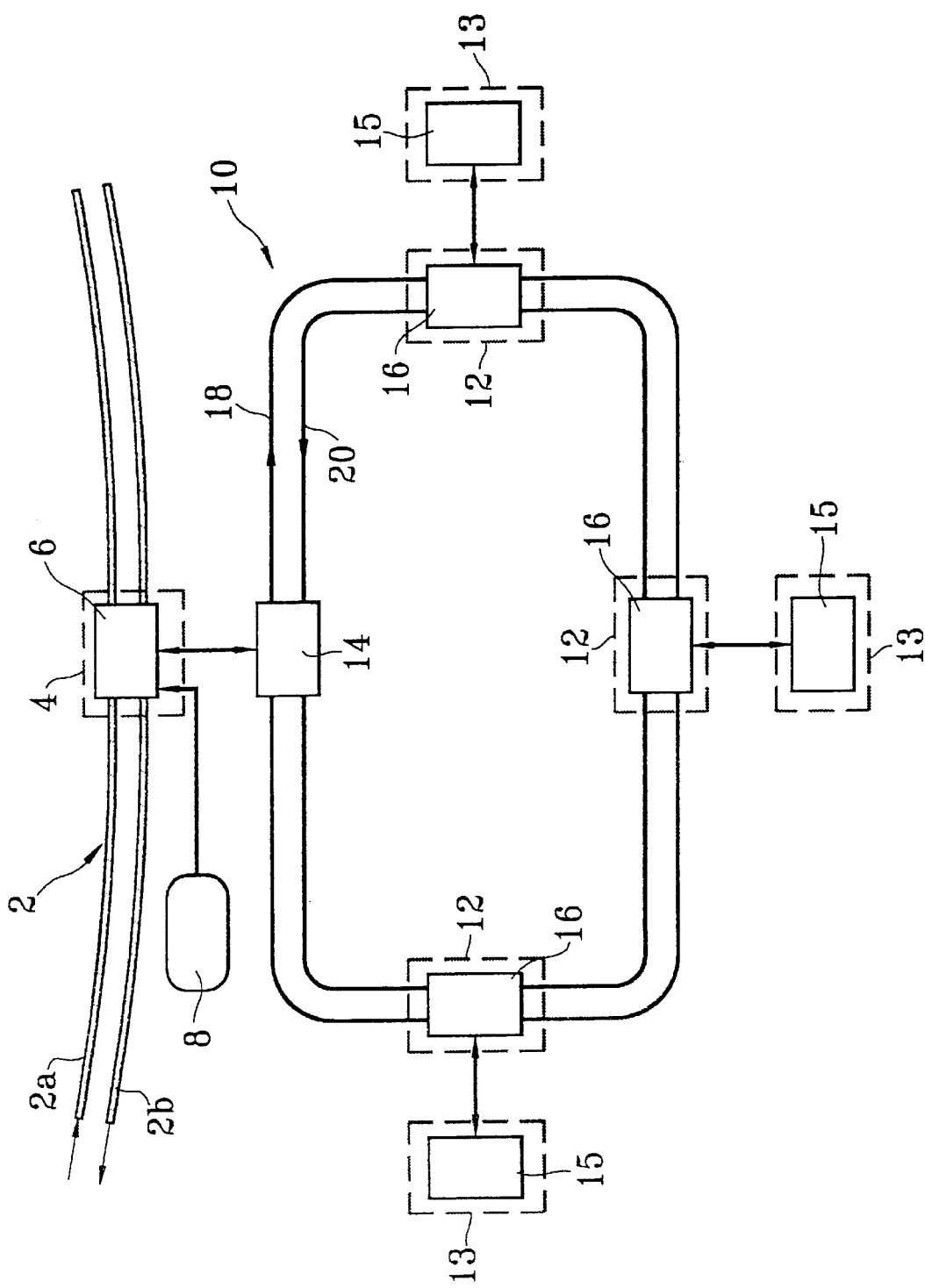
FIG. 1 is a schematic view of a standard single-directional SDH ring.

This is schematically illustrated by FIG. 1, in which a main transmission network 2 is shown in ring form (shown partially).

This network 2 comprises two optical fibers 2a and 2b which carry information in optical form in opposite directions, and which pass successively through the nodes in the network 2.

One of these nodes 4 is shown, which is called the main node and in which there is an ADM 6.

This ADM 6 is connected to network management means 8.

FIG. 1 also shows another network 10 in ring form that comprises several nodes 12, three nodes in the example shown.

The network 10 also comprises another ADM 14 which is connected to ADM 4.

Each of the nodes 12 is associated with a site 13 that corresponds to a user equipped with equipment 15.

This equipment 15 is an ADM or preferably a terminal multiplexer.

Furthermore, each node 12 contains an ADM 16 that is designed to exchange information in optical form with equipment 15 located on site 13 associated with this node.

Nodes 12 and the ADM 14 are connected to each other by an optical fiber 18 called the normal fiber that forms a loop in which information passes in a given direction from the ADM 14, passing successively through nodes 12 to return to this ADM 14.

In the example shown, another optical fiber 20 called the standby fiber also forms a loop in which information passes in the direction opposite to that in the previous loop from ADM 14 passing through nodes 12 successively to return to this ADM 14.

The network 10 is a standard single directional SDH ring with ADM that uses only a single optical wave length λ, for example equal to 1.3 μm, to carry information on fibers 18 and 20.

Users exchange information with each other at this wave length λ.

According to this invention, the network in FIG. 1 is modified in order to set up temporary optical links between network users, with two users at any one time, at a wave length λc (not equal to λ), in addition to the links that already exist at wave length λ.

This thus provides additional services (corresponding to this wave length λc) additional to the services already installed on the network (at wave length λ)

Links at wave length λc can be reconfigured and the wave lengths λ and λc are multiplexed.

Figure 2:
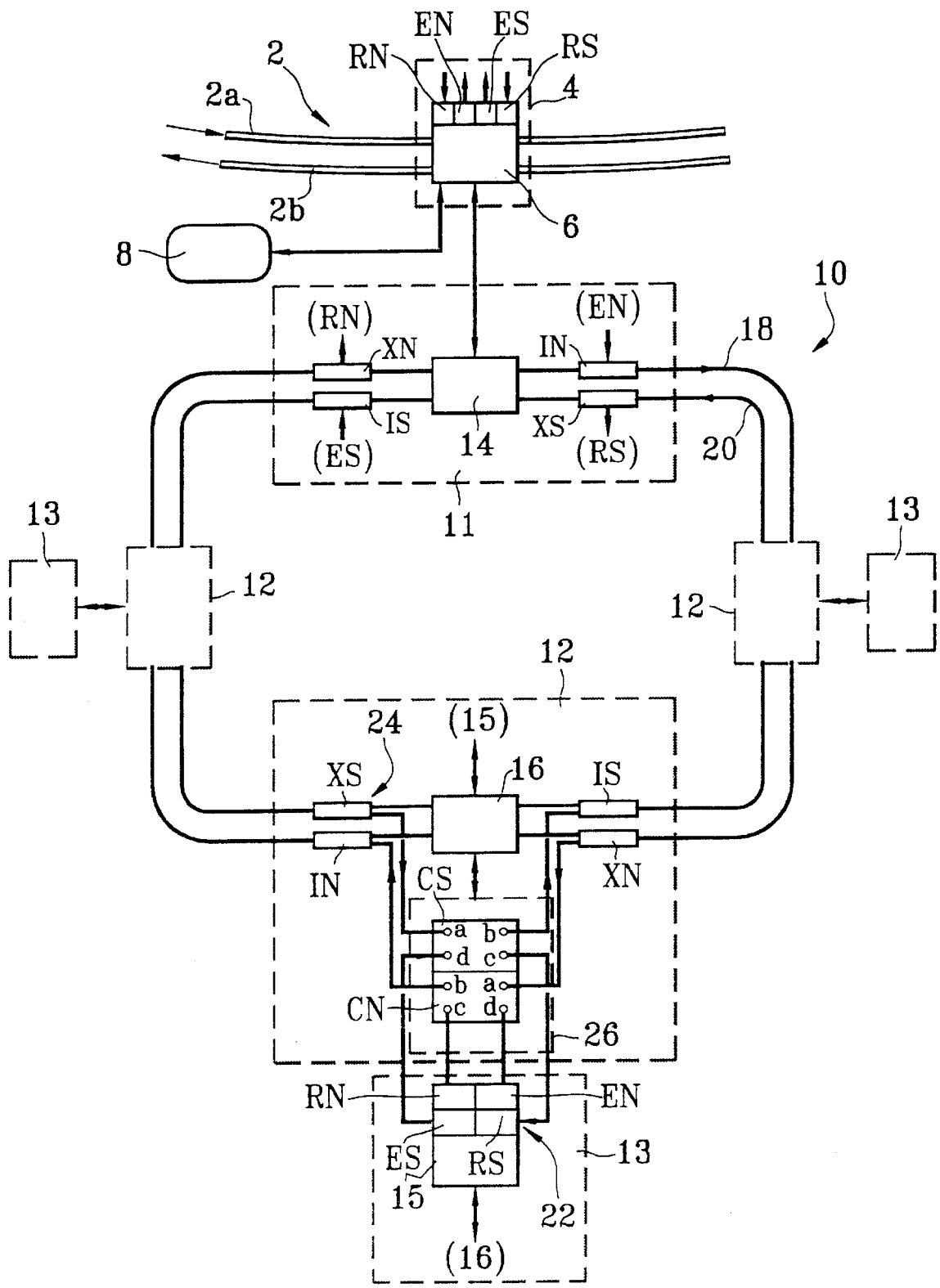
FIG. 2 is a schematic view of a particular embodiment of the ring network according to the invention used to connect users on the same ring, FIGS. 3 and 4 schematically illustrate two states of the cross-bar optical switches forming part of the network in FIG. 2.

As shown schematically in FIG. 2, this is done by providing equipment 15 (ADM or terminal multiplexer) located on each site 13, with means 22 of transmission-reception for wave length λc, and optical add-drop means for wave length λc 24, and optical switching means 26, are added at each node 12.

These additions are shown in detail in FIG. 2 for one of the nodes 12, but are not shown for the other two nodes 12.

Since the ring 10 in FIG. 2 comprises a normal optical fiber 18 and a standby optical fiber 20, the added means 22, 24 and 26 are doubled up.

Means 22 comprise a transmitter EN and a receiver RN for fiber 18 and a transmitter ES and a receiver RS for fiber 20.

Means 24 comprise means XN for fiber 18 and means XS for fiber 20, in order to extract signals at wave length λc propagating in this fiber, and means IN and IS for fibers 18 and 20 respectively to insert signals of wave length λc among the signals being carried through this fiber.

As can be seen in FIG. 2, considering the direction of propagation of light in each of the fibers 18 and 20, means XN and XS are installed before ADM 16, whereas means IN and IS are installed after this ADM 16.

Means 26 comprise an optical switch CN associated with fiber 18 and an optical switch CS associated with the fiber 20.

Each of these optical switches CN and CS may be in one of two separate states.

For example, we will use optical cross-bar type switches.

Management means 8 send control signals to switches CN and CS through ADM 6, ADM 14, fibers 18 and 20 and ADM 16.

These control signals put each of these switches into the required state.

As can be seen in FIG. 2, each of these switches CN and CS has four terminals a, b, c and d.

The terminals a on switches CN and CS are connected to means XN and XS respectively.

Terminals b on switches CN and CS are connected to means IN and IS respectively.

Terminals c on switches CN and CS are connected to receivers RN and RS respectively.

Terminals d on switches CN and CS are connected to transmitters EN and ES respectively.

As can be seen in FIG. 2, ADM 6, located on node 4 in the main network 2, is also equipped with two affluent cards each comprising transmitter and a receiver at length $\lambda c$.

The transmitters on these affluent cards corresponding to fibers 10 and 20 respectively are again referenced EN and ES respectively.

The receivers corresponding to these fibers 10 and 20 are assigned the references RN and ES respectively.

Add-drop means for the particular wave length $\lambda c$, references IN, XN and IS, XS, have also been placed on fibers 10 and 20 close to ADM 14 which is connected to ADM 6.

These means XN, IN, XS and IS are connected to the receiver RN, transmitter EN, receiver RS and transmitter ES respectively, on ADM 6, as can be seen in FIG. 2.

Concerning the direction of propagation of light in fibers 10 and 20, each of the means XN and XS is installed on the input side of ADM 14, whereas each of the means IN and IS is installed on the output side of this ADM 14.

Since ring 10 is closed on itself (concerning communications between its nodes) at node 4 in network 2, each of the transmitters EN and ES for wave length $\lambda c$, located in ADM 6, is designed to send information at this wave length $\lambda c$ to users of network 10.

Similarly, each receiver RN and RS at wave length $\lambda c$ located on this ADM 6, is designed to detect information at this wave length $\lambda c$ originating from these users.

Figure 3:
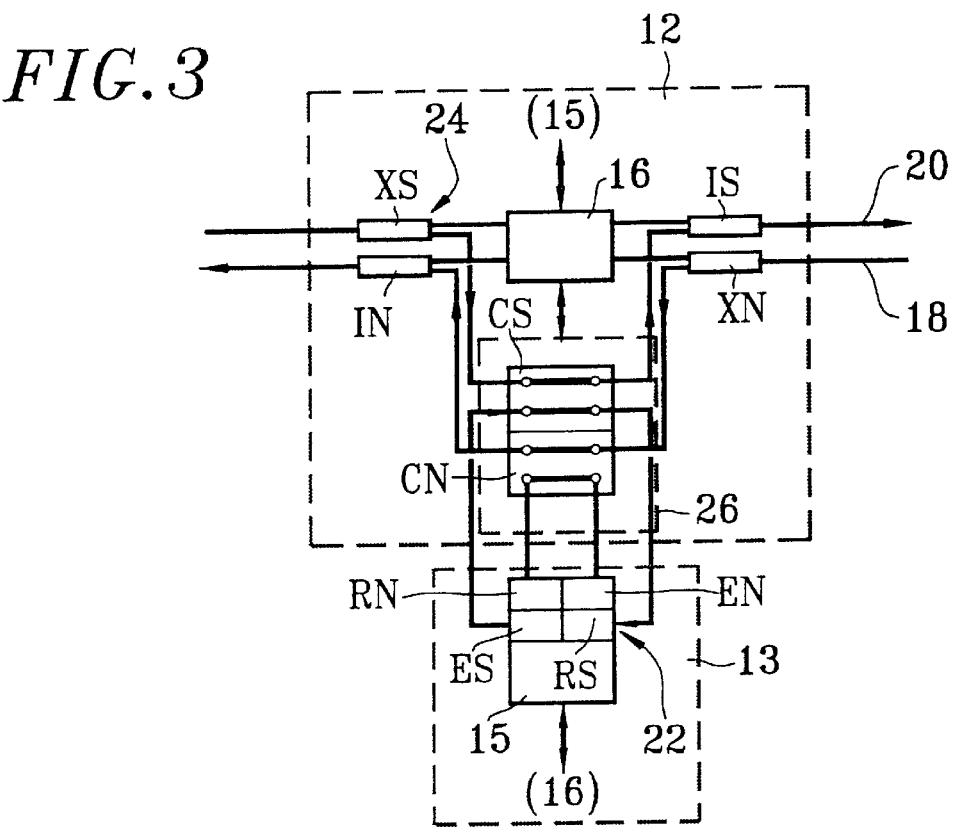

FIG. 3 schematically shows the configuration of a node 12 at rest.

In this case, each of the optical switches CN and CS on this node 12 is in the "bar" state and equipment 15 of the user associated with this node is disconnected from the ring 10.

Figure 4:
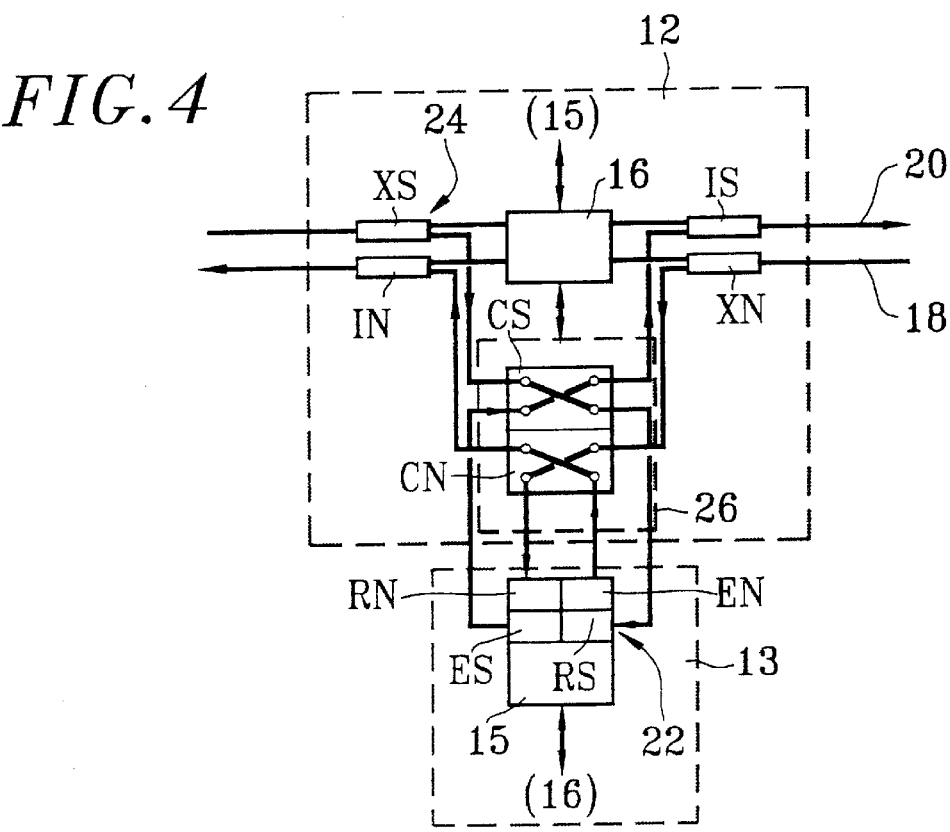

FIG. 4 schematically illustrates the opposite configuration of this node 12.

On the other hand, in the case shown in FIG. 4, the two optical switches CN and CS are in the "cross" state.

Under these conditions, the equipment 15 of the user associated with node 12 is connected to the ring 10.

Note that these cross-bar switches are controlled by signals at wave length $\lambda$ through the associated ADM 16.

The equipment 15 of each user may be an STM-1 ADM or preferably a terminal ADM with an input STM-1 flow with a useful digital load (2, 8, 34 or 140 Mbits/s) or ATM.

Furthermore, wave lengths $\lambda$ and $\lambda c$ are for example equal to 1.3 $\mu$m and 1.5 $\mu$m respectively.

Cross-bar optical switches are controlled by the network operator form ring supervision, for example through environment inputs and outputs provided on ADMs used for the SDH.

The output state can be controlled and therefore a switch can be forced to change to the "cross" state.

An environment input is used to check the active state of the switch before giving permission to users to set up a communication.

Insertion and extraction means for wave length $\lambda c$ (optical fibers) are commercially available from the ATI, JDS, E-TeK and Dicon companies with a loss of less than 1.5 dB.

The cross-bar type optical switches used are available from the same companies with a loss of less than 1 dB.

Furthermore, control voltages of 5 V could be used, although this is mentioned for guidance only and is in no way restrictive.

The network according to the invention schematically shown in FIG. 2 is capable of putting two users in communication with each other, when requested.

When all optical switches CN and CS in the ring 10 are in the "bar" state, signals at wave length $\lambda c$ do a complete revolution around ring 10 through these switches CN and CS.

When a user of a site 13 who is connected to one of the nodes 12 wants to transmit information at this wave length $\lambda c$, this user asks the network manager to reserve the wave length $\lambda c$ to set up a communication with another user of his choice who will be the called party.

The network manager starts by checking that this called party is available and then gives its agreement to set up the communication and controls the optical switches on the corresponding nodes.

These switches change from their at rest position ("bar" state) to their working position ("cross" state).

The link is then set up between two users on two different nodes and information may be exchanged at wave length $\lambda c$.

To terminate the link, the user who asked for the link signals the end of transmission to the network manager and the network manager interrupts this link by putting the optical switches considered into the "bar" state.

Ring 10 is once again available to set other temporary links at wave length $\lambda c$ between other users.

Figure 5:
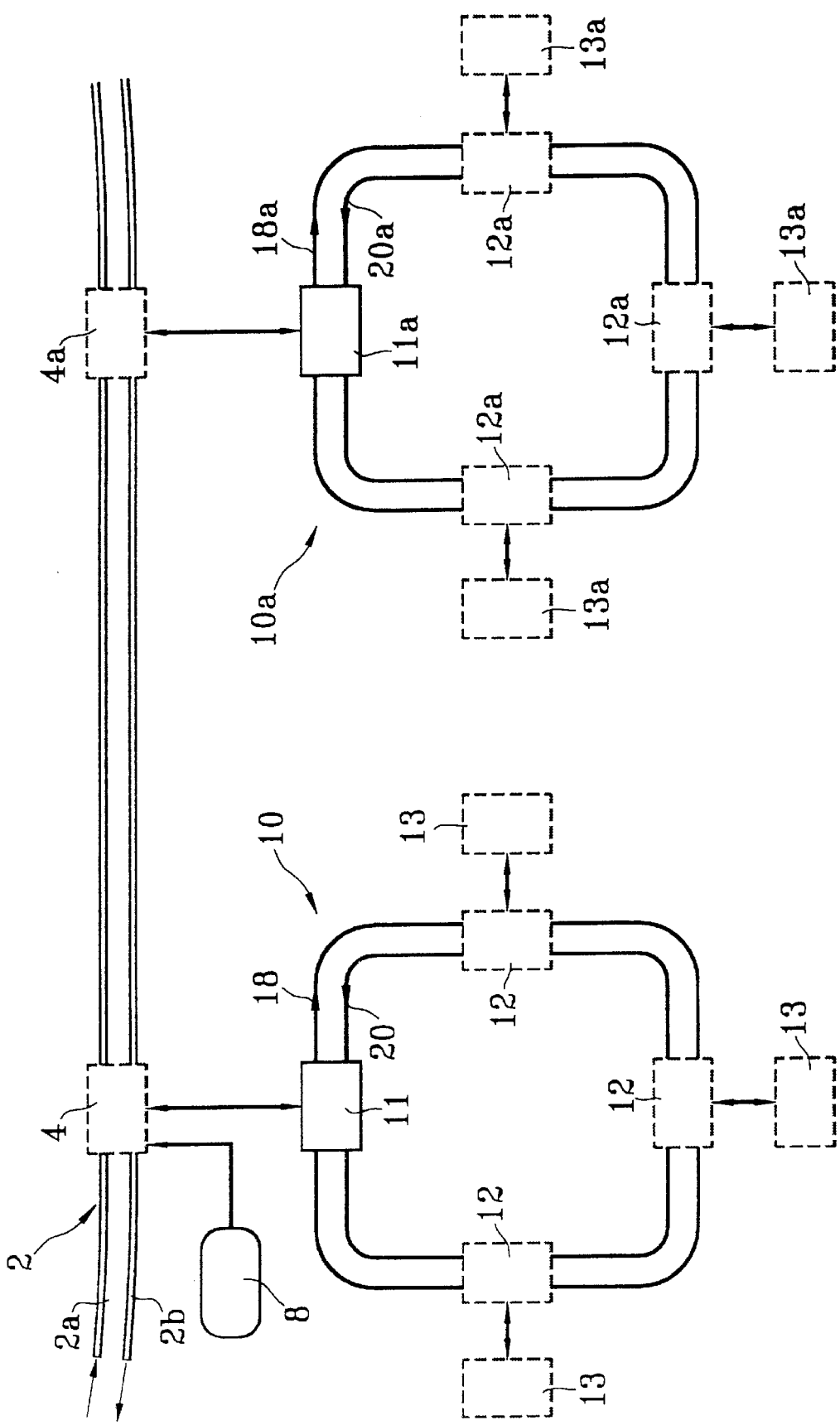
FIG. 5 is a schematic view of another particular embodiment used to connect users in two different rings.

FIG. 5 is a schematic view of another particular embodiment of the network according to the invention.

In the case shown in FIG. 5, the network comprises ring 10 in FIG. 2, which is connected to the main network 2 through the main node 4 of this network 2, but also one or several other rings such as ring 10a which is connected to another main node 4a of network 2.

Node 4a is made up of the same way as node 4, with an ADM which is equipped with transmission-reception means for wave length $\lambda c$ (not shown).

However, note that network management means 8 are simply connected to node 4 as was described previously.

Ring 10a is also identical to ring 10, the references of the components of this ring 10a being the same as the references of the corresponding components in ring 10 followed by the letter a.

This is why these rings 10 and 10a have been shown very schematically in FIG. 5, given that ring 10 is shown in detail in FIG. 2 and has already been described.

FIG. 5 simply shows corresponding nodes 12 and 12a and the corresponding sites 13 and 13a on these corresponding rings 10 and 10a (there are three of them in the example shown).

Note that the reference 11 corresponds to the assembly comprising the ADM 14 and means XN, EN, IS and RS in FIG. 2.

The network in FIG. 5 can be used to set up a temporary link between two users connected to rings 10 and 10a respectively through the network 2.

In this network 2 (which is also a ring in the case shown in FIGS. 2 and 5), the information exchanged is treated as if it originated from users connected to ring 10.

Note that the interfaces used in the examples in FIGS. 2 and 5 preferably belong to the SDH (STM-1 flow) since with these interfaces, the transmission can be supervised with currently available management means.

However, the exchanged flow may be digital according to the Plesiochronous Digital Hierarchy (2, 8 or 34 Mbit/s) or the Asynchronous Transfer Mode could be used.

Figure 6:
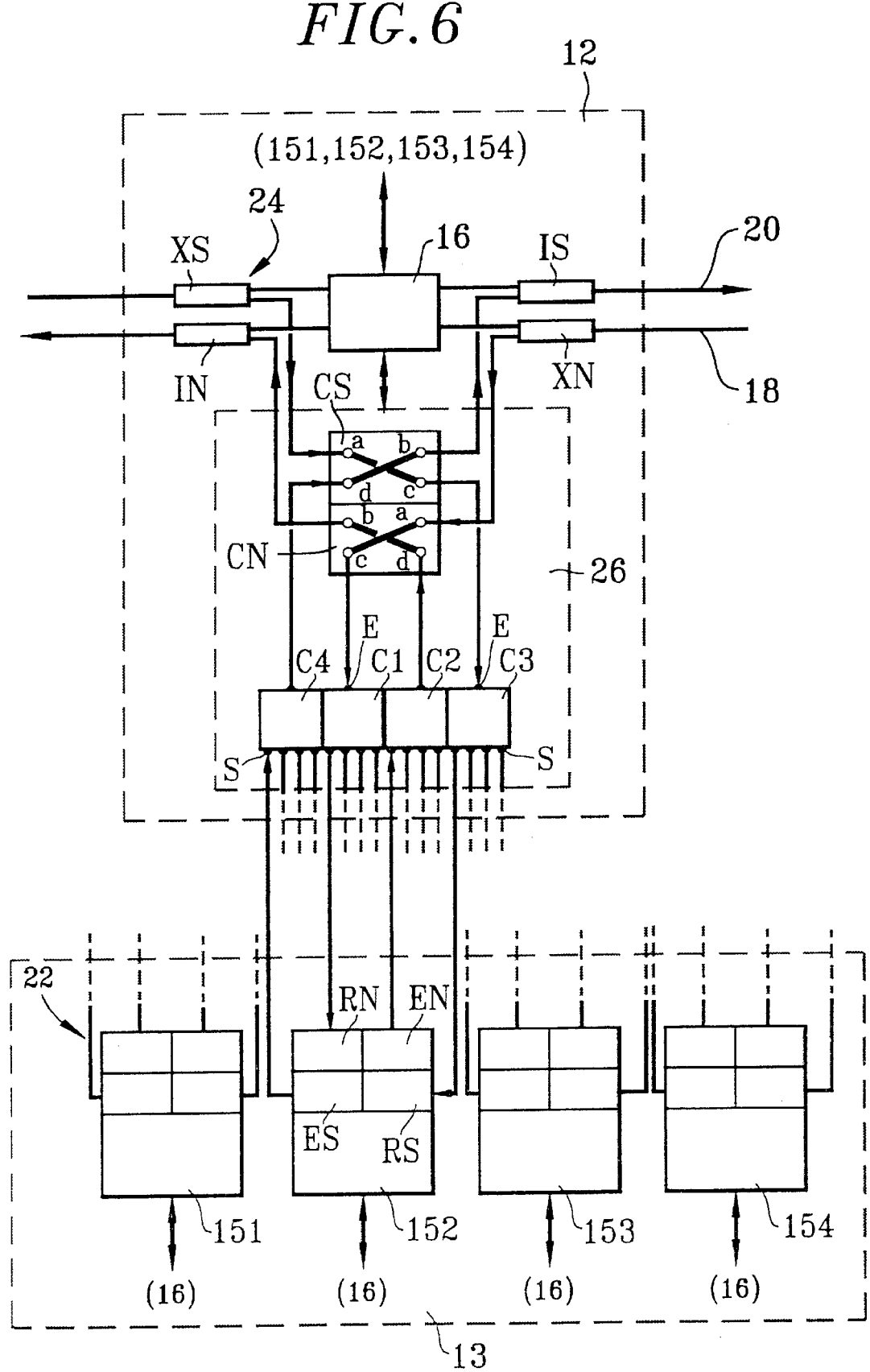
FIG. 6 is a schematic and partial view of another particular embodiment in which several users are associated with the same node in the form of a ring.

FIG. 6 is a schematic and partial view of another network according to the invention in which one or several sites in ring 10 in FIG. 2, for example all these sites, have N users rather than a single user, where N is an integer number not less than 2.

This number N is equal to 4 in the example shown in FIG. 6.

In this case each site concerned, and the node associated with this site, are modified as described below.

FIG. 6 shows that the four users on the site considered are each equipped with equipment (ADM or a terminal multiplexer) 151, 152, 153, 154.

Each of these items of equipment is itself equipped with transmission-reception means 22 for wave length $\lambda c$ which are mentioned on the description of FIG. 2.

The corresponding node 12 comprises add-drop means IN, XN, IS, XS and switches CN, CS mentioned in the description of FIG. 4, and in addition it also comprises four optical switches of the 1 to 4 type which are also controlled by network management means 8 (FIG. 2) through the ADM 16 for the node considered and which are referenced C1, C2, C3 and C4.

The set of switches CN and CS and the switches C1, C2, C3 and C4 form the switching means 26 in the case shown in FIG. 6.

Each of these type 1 to 4 optical switches is capable of being in one of four different states; under the control of management means 8, its input E may be connected to whichever of its four outputs S was selected.

Links between the cross-bar switches CN and CS and add-drop means IN, XN, IS, XS are identical to those described above with reference to FIG. 2.

Furthermore, terminals c and d on switch CN are connected to the inputs of switches C1 and C2 respectively, whereas terminals c and d of switch CS are connected to the inputs of switches C3 and C4 respectively.

Furthermore, the outputs of switches C1 to C4 are connected to transmission-reception means fitted on equipment such that, when switches CN and CS are in the "cross" state, only one of the four users is connected to the optical fibers 18 and 20.

Refer to FIG. 6 in which these switches C1, C2, C3 and C4 are in their "cross" state, and which only shows the connection between the transmission-reception means of one of the four users and these switches, this user being the only user connected to fibers 18 and 20.

Note that outputs of the same rank j, where j is between 1 and 4, of switches C1 to C4 are connected to means EN, RN, ES, RS assigned to the same equipment, respectively.

If the two switches CN and CS are in the "bar" state, none of the four users is connected to optical fibers 18 and 20.

In one embodiment not shown, one or several other wave lengths (not equal to $\lambda$) may be used for these temporary links, in addition to the wave length $\lambda c$ (for example equal to 1.3 $\mu$m) used to set up temporary links between network users in FIG. 2.

For example, another wave length $\lambda 1$ equal to 1.58 $\mu$m may be used.

It is thus possible to set up two temporary links simultaneously.

All that is necessary to achieve this is to equip the ADM 6 on node 4 in FIG. 2 with transmission-reception means for wave length $\lambda c$, but also to use additional transmission-reception means dedicated to wave length $\lambda 1$.

Similarly, add-drop means for wave length $\lambda 1$ are added to the add-drop means that are dedicated to this wave length $\lambda c$ and placed adjacent to ADM 14.

These add-drop means for wave length $\lambda 1$ are obviously linked to additional transmission-reception means on ADM 6.

Similarly, additional add-drop means dedicated to wave length $\lambda 1$ are then added, and additional transmission-reception means for wave length $\lambda 1$ are added to equipment 15 on the corresponding site 13.

Furthermore, in node 12 two optical cross-bar switches are added to the additional add-drop means and to the additional transmission-reception means in equipment 15.

The following documents are referenced in this description:

(1) Ph. Guignard, A. Hamel, "Improvement of an Ethernet Network using multiwavelength techniques", Efoc-Lan'92, pp 346–349.

(2) G. Miller, "IBM building all lightwave network", Lightwave journal, March 1991.

(3) M. J. Chawki, V. Tholey et al, "Demonstration of a WDM Survivable open ring network using reconfigurable channel dropping receivers", ECOC 94, pp 897–900.

(4) M. I Irshid, M. Kavehrad, "A fully transparent fiber optic ring architecture for WDM networks", Journal of Lightwave Technology, vol. 10 No. 1, January 92, pp 101–108.

(5) J. E. Baran, D. A. Smith, A. D'Alessandro, "Multi-wavelength performance of an apodized acousto-optic switch", OCF'94, pp 57–58.

What is claimed is:

1. Reconfigurable transmission network for connection of users, this network comprising at least one information transmission ring (10, 10a) in optical form and network management means (8), each ring comprising:

several nodes (12, 12a), each node being associated with a site (13, 13a) on which there is at least one user, and at least one optical fiber in the form of a ring (18, 18a–20, 20a) that passes through each node in turn and which is designed to carry information in a given direction this network being characterized in that it also comprises:
- on each site, transmission-reception means (EN, ES, RN, RS) for one or more particular wave lengths, and
- at each node, optical add-drop means (IN, IS, XN, XS) for the particular wave length and optical switching means (CN, CS) that are capable of being in first and second states, are controlled by the network management means and are capable of optically connecting the transmission-reception means included on the corresponding site to the add-drop means when they are in the first state, and optically isolating the transmission-reception means from the add-drop means when they are in the second state, these add-drop means being designed to extract information at the particular wave length from each optical fiber in the form of a ring, to send them to the transmission-reception means on the corresponding site and to insert information at the particular wave length from these transmission-reception means in each optical fiber in the form of a ring,
- in order to create temporary optical links at the particular wave length under the control of the management means, between users on distinct sites, for two users at a time
- wherein each node comprises an electronic add-drop multiplexer (16) which is designed to exchange information in optical form with the corresponding site, and through which management means control optical switching means for this node.

2. Reconfigurable transmission network for connection of users, this network comprising at least one information transmission ring (10, 10a) in optical form and network management means (8), each ring comprising:
- several nodes (12, 12a) each node being associated with a site (13, 13a) on which there is at least one user, and
- at least one optical fiber in the form of a ring (18, 18a–20, 20a) that passes through each node in turn and which is designed to carry information in a given direction, this network being characterized in that it also comprises:
- on each site, transmission-reception means (EN, ES, RN, RS) for one or more particular wave lengths, and
- at each node, optical add-drop means (IN, IS, XN, XS) for the particular wave length and optical switching means (CN, CS) that are capable of being in first and second states, are controlled by the network management means and are capable of optically connecting the transmission-reception means included on the corresponding site to the add-drop means when they are in the first state, and optically isolating the transmission-reception means from the add-drop means when they are in the second state, these add-drop means being designed to extract information at the particular wave length from each optical fiber in the form of a ring, to send them to the transmission-reception means on the corresponding site and to insert information at the particular wave length from these transmission-reception means in each optical fiber in the form of a ring,
- in order to create temporary optical links at the particular wave length under the control of the management means, between users on distinct sites, for two users at a time
- wherein the ring (10) is connected to a main information transmission network (2), at least one electronic add-drop multiplexer (6) being installed on this main information transmission network, equipped with transmission-reception means (EN, ES, RN, RS) for a particular wave length and connected to the ring (10, 10a) through add-drop means (IN, IS, XN, XS) for the particular wave length.

3. Reconfigurable transmission network for connection of users, this network comprising at least one information transmission ring (10. 10a) in optical form and network management means (8), each ring comprising:
- several nodes (12, 12a), each node being associated with a site (13, 13a) on which there is at least one user, and
- at least one optical fiber in the form of a ring (18, 18a–20, 20a) that passes through each node in turn and which is designed to carry information in a given direction, this network being characterized in that it also comprises:
- on each site. transmission-reception means (EN, ES, RN, RS) for one or more particular wave lengths, and
- at each node, optical add-drop means (IN, IS, XN, XS) for the particular wave length and optical switching means (CN, CS) that are capable of being in first and second states, are controlled by the network management means and are capable of optically connecting the transmission-reception means included on the corresponding site to the add-drop means when they are in the first state, and optically isolating the transmission-reception means from the add-drop means when they are in the second state, these add-drop means being designed to extract information at the particular wave length from each optical fiber in the form of a ring, to send them to the transmission-reception means on the corresponding site and to insert information at the particular wave length from these transmission-reception means in each optical fiber in the form of a ring, in order to create temporary optical links at the particular wave length under the control of the management means, between users on distinct sites, for two users at a time
- wherein the network comprises several of the rings (10, 10a) connected to a main information transmission network (2), several electronic add-drop multiplexers (6) being installed on this main information transmission network and respectively associated with said rings, each electronic add-drop multiplexer being equipped with transmission-reception means (EN, ES, RN, RS) for the particular wave length and connected to the corresponding ring through add-drop means (IN, IS, XN, XS) for the particular wave length.

4. Reconfigurable transmission network for connection of users, this network comprising at least one information transmission ring (10, 10a) in optical form and network management means (8), each ring comprising:
- several nodes (12, 12a), each node being associated with a site (13, 13a) on which there is at least one user, and
- at least one optical fiber in the form of a ring (18, 18a–20, 20a) that passes through each node in turn and which is designed to carry information in a given direction.

this network being characterized in that it also comprises:
- on each site, transmission-reception means (EN, ES, RN, RS) for one or more particular wave lengths, and
- at each node, optical add-drop means (IN, IS, XN, XS) for the particular wave length and optical switching means (CN, CS) that are capable of being in first and second states, are controlled by the network management means and are capable of optically connecting the transmission-reception means included on the corresponding site to the add-drop means when they are in the first state, and optically isolating the transmission-reception means from the add-drop means when they are in the second state, these add-drop means being designed to extract information at the particular wave length from each optical fiber in the form of a ring, to send them to the transmission-reception means on the corresponding site and to insert information at the particular wave length from these transmission-reception means in each optical fiber in the form of a ring, in order to create temporary optical links at the particular wave length under the control of the management means, between users on distinct sites, for two users at a time wherein at least one site (13) comprises N users respectively associated with N transmission-reception means for the particular wave-length where N is an integer number not less than 2, the node (12) corresponding to this site comprising N type 1 to N optical switches (C1, C2, C3, C4) which are controlled by said network management means (8) so as to create an optical link at the particular wave length between any one of the users on this site and a user on another site.

5. Network according to any one of claims 1 to 4, comprising two optical fibers in the form of a ring (18, 18a–20, 20a) for carrying information in opposite directions.

6. Network according to any one of claims 1 to 4, in which the optical switching means (CN, CS) capable of being in the first and second states are cross-bar type switches.

7. Network according to any one of claims 1 to 4, in which the wave length of the information in optical form is equal to 1.3 $\mu$m and the particular wave length is equal to 1.5 $\mu$m.

8. Network according to any one of claims 1 to 4, in which each site (13) comprises transmission-reception means for several particular wave lengths, which are respectively associated with several optical add-drop means for these particular wave lengths, so as to set up several temporary optical links at the same time.

9. Network according to any one of claims 1 to 4, in which each ring (10, 10a) is designed to use the Synchronous Digital Hierarchy.

* * * * *